(12) United States Patent
Nemoto et al.

(10) Patent No.: US 12,304,529 B2
(45) Date of Patent: May 20, 2025

(54) VEHICLE CONTROL SYSTEM AND VEHICLE TRAVEL CONTROL DEVICE

(71) Applicant: TOYOTA JIDOSHA KABUSHIKI KAISHA, Toyota (JP)

(72) Inventors: Kazuki Nemoto, Susono (JP); Shin Tanaka, Numazu (JP); Satoshi Nakamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 17/499,225

(22) Filed: Oct. 12, 2021

(65) Prior Publication Data
US 2022/0204036 A1  Jun. 30, 2022

(30) Foreign Application Priority Data
Dec. 24, 2020 (JP) .................................. 2020-215236

(51) Int. Cl.
*B60W 60/00* (2020.01)
*B60S 1/46* (2006.01)
*B60S 1/56* (2006.01)
(Continued)

(52) U.S. Cl.
CPC ........... *B60W 60/0015* (2020.02); *B60S 1/46* (2013.01); *B60S 1/56* (2013.01); *B60W 10/04* (2013.01);
(Continued)

(58) Field of Classification Search
CPC ............ B60S 1/56; B60S 1/486; B60S 1/481; B60W 10/04; B60W 10/18; B60W 10/20;
(Continued)

(56) References Cited

U.S. PATENT DOCUMENTS

2015/0296108 A1  10/2015  Hayakawa et al.
2019/0041849 A1*  2/2019  Kida .................... G05D 1/0055
(Continued)

FOREIGN PATENT DOCUMENTS

CN  111819120 A  10/2020
CN  112118987 A  12/2020
(Continued)

*Primary Examiner* — Ig T An
*Assistant Examiner* — Richard J Schuler
(74) *Attorney, Agent, or Firm* — Dinsmore & Shohl LLP

(57) ABSTRACT

In a vehicle control system that controls a vehicle that performs autonomous driving, the vehicle control system includes an autonomous driving control device that generates a target trajectory for autonomous driving of the vehicle, and an vehicle travel control device that executes vehicle travel control that controls steering, acceleration, and deceleration of the vehicle such that the vehicle follows the target trajectory. The vehicle travel control device is configured to determine whether an operation request condition for washer operation for ejecting washer solution toward a windshield of the vehicle is satisfied, transmit an approval request for the washer operation to the autonomous driving control device when the operation request condition is satisfied, and execute the washer operation when approval for the approval request is received from the autonomous driving control device.

10 Claims, 4 Drawing Sheets

(51) Int. Cl.
*B60W 10/04* (2006.01)
*B60W 10/18* (2012.01)
*B60W 10/20* (2006.01)
*B60W 30/09* (2012.01)

(52) U.S. Cl.
CPC ............ *B60W 10/18* (2013.01); *B60W 10/20* (2013.01); *B60W 30/09* (2013.01); *B60W 2555/20* (2020.02); *B60W 2710/20* (2013.01); *B60W 2720/106* (2013.01); *B60W 2720/125* (2013.01)

(58) Field of Classification Search
CPC ......... B60W 2555/20; B60W 2710/20; B60W 2720/106; B60W 2720/125; B60W 60/001; B60W 50/00
See application file for complete search history.

(56) References Cited

U.S. PATENT DOCUMENTS

| | | |
|---|---|---|
| 2019/0283729 A1 | 9/2019 | Ikebata et al. |
| 2019/0322245 A1* | 10/2019 | Kline .................... B60S 1/0848 |
| 2021/0039670 A1* | 2/2021 | Sakai .................... B60W 50/14 |
| 2021/0122294 A1* | 4/2021 | Mandai ................ H04N 23/811 |
| 2021/0197769 A1* | 7/2021 | Shirakura ............... B60S 1/486 |

FOREIGN PATENT DOCUMENTS

| | | |
|---|---|---|
| JP | 2017-114195 A | 6/2017 |
| JP | 2019-162915 A | 9/2019 |
| WO | 2014/017405 A1 | 1/2014 |
| WO | 2019/209791 A1 | 10/2019 |

* cited by examiner

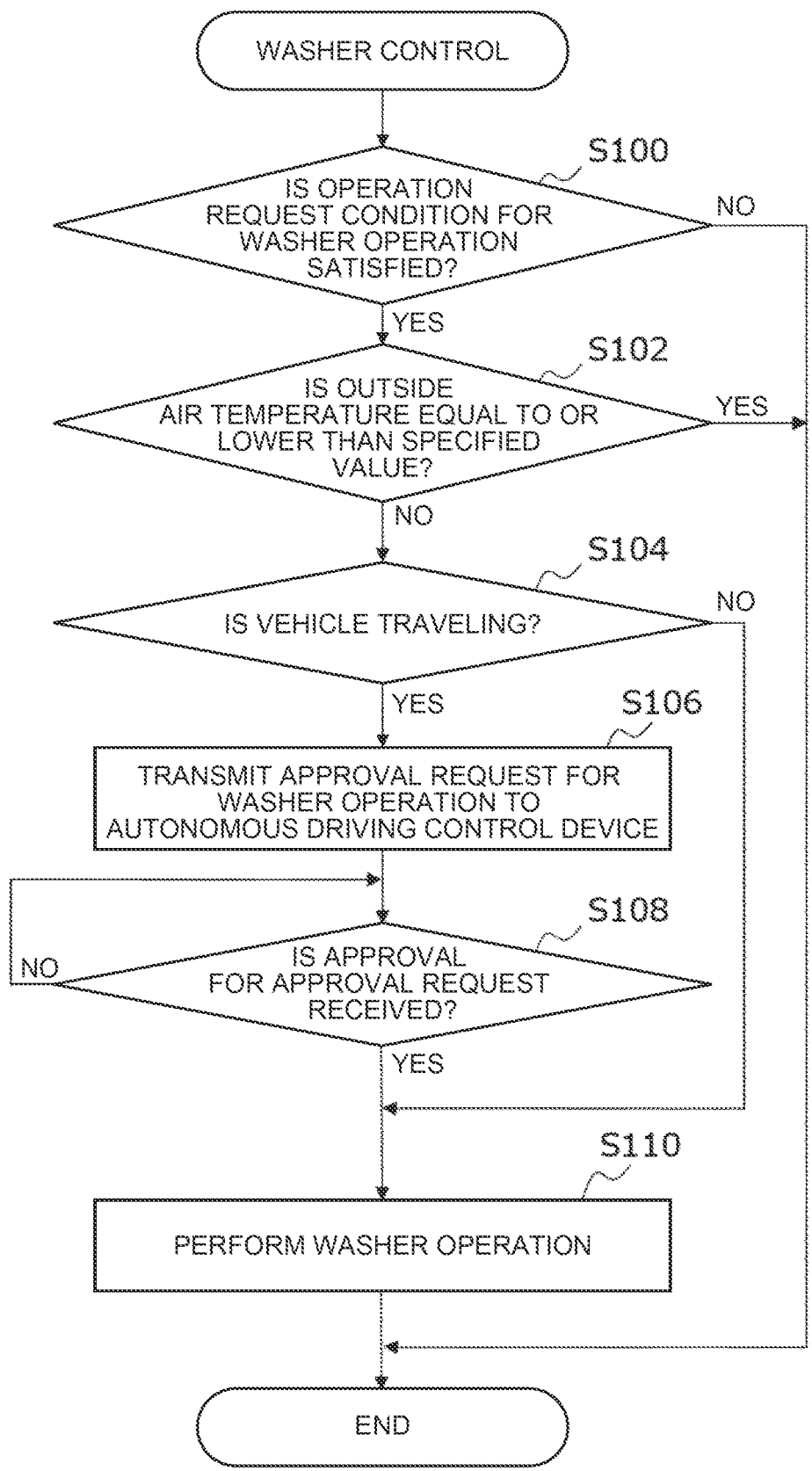

VEHICLE CONTROL SYSTEM AND VEHICLE TRAVEL CONTROL DEVICE

CROSS-REFERENCE TO RELATED APPLICATION

This application claims priority to Japanese Patent Application No. 2020-215236 filed on Dec. 24, 2020, incorporated herein by reference in its entirety.

BACKGROUND

1. Technical Field

The present disclosure relates to a vehicle control system and a vehicle travel control device.

2. Description of Related Art

Japanese Unexamined Patent Application Publication No. 2017-114195 (JP 2017-114195 A) discloses a technique relating to a vehicle control device capable of avoiding interference of traveling control when collision avoidance control is performed. The vehicle control device of this technique executes first control (collision avoidance control) for avoiding a collision between a vehicle and an obstacle. Further, the vehicle control device executes second control such as cruise control and lane keeping control. The vehicle control device recognizes the obstacle around the vehicle, and determines whether a predetermined collision avoidance condition is satisfied based on the recognition result. When it is determined that the collision avoidance condition is satisfied during execution of the second control, the vehicle control device stops the second control and executes the first control.

SUMMARY

Here, it is considered that an autonomous driving control device calculates a target trajectory based on a travel plan of autonomous driving, and a vehicle travel control device controls travel of a vehicle so as to follow the target trajectory. A sensor device such as a camera is disposed in a vehicle cabin such that the vehicle travel control device acquires surrounding information via a windshield of the vehicle. The recognition level of the sensor device may deteriorate due to dirt on the windshield. In such a case, the vehicle travel control device can remove the dirt on the windshield by executing operation for ejecting washer solution.

However, the vehicle is provided with various sensor devices that allow the autonomous driving control device to recognize the situation around the vehicle. Therefore, the operation for ejecting the washer solution by the vehicle travel control device may adversely affect the recognition level of the sensor devices that are used by the autonomous driving control device for a temporary period of time.

The present disclosure has been made in view of the above issue, and an object of the present disclosure is to provide a vehicle control system and a vehicle travel control device capable of avoiding the operation for ejecting the washer solution at an inappropriate timing for the autonomous driving control device.

In order to solve the above issue, a first disclosure is applied to a vehicle control system that controls a vehicle that performs autonomous driving. The vehicle control system includes an autonomous driving control device that generates a target trajectory for the autonomous driving of the vehicle, and a vehicle travel control device that executes vehicle travel control that controls steering, acceleration, and deceleration of the vehicle such that the vehicle follows the target trajectory. The vehicle travel control device is configured to determine whether an operation request condition for washer operation for ejecting washer solution toward a windshield or a sensor device of the vehicle is satisfied, transmit an approval request for the washer operation to the autonomous driving control device when the operation request condition is satisfied, and execute the washer operation when approval for the approval request is received from the autonomous driving control device.

A second disclosure further has the following features in the first disclosure. The vehicle includes a surrounding situation sensor that recognizes a situation around the vehicle from a vehicle cabin via the windshield. The vehicle travel control device is configured to, based on surrounding information acquired by the surrounding situation sensor, execute preventive safety control that intervenes in a control amount of the vehicle travel control such that a collision between the vehicle and an obstacle is prevented or avoided. The operation request condition includes that a recognition level of the surrounding situation sensor is lower than a threshold value.

A third disclosure further has the following features in the second disclosure. The operation request condition includes that an outside air temperature is higher than a freezing temperature of the washer solution.

A fourth disclosure further has the following features in any one of the first to third disclosures. The vehicle travel control device is configured to execute the washer operation without transmitting the approval request to the autonomous driving control device when the operation request condition is satisfied and the vehicle is stopped.

Further, in order to solve the above issue, a fifth disclosure is applied to a vehicle travel control device configured to receive a target trajectory for autonomous driving of a vehicle, the target trajectory being generated by an autonomous driving control device, and execute vehicle travel control that controls steering, acceleration, and deceleration of the vehicle such that the vehicle follows the target trajectory. The vehicle travel control device is configured to determine whether an operation request condition for washer operation for ejecting washer solution toward a windshield or a sensor device of the vehicle is satisfied, transmit an approval request for the washer operation to the autonomous driving control device when the operation request condition is satisfied, and execute the washer operation when approval for the approval request is received from the autonomous driving control device.

A sixth disclosure further has the following features in the fifth disclosure. The vehicle includes a surrounding situation sensor that recognizes a situation around the vehicle from a vehicle cabin via the windshield. The vehicle travel control device is configured to, based on surrounding information acquired by the surrounding situation sensor, execute preventive safety control that intervenes in a control amount of the vehicle travel control such that a collision between the vehicle and an obstacle is prevented or avoided. The operation request condition includes that a recognition level of the surrounding situation sensor is lower than a threshold value.

A seventh disclosure further has the following features in the sixth disclosure. The operation request condition includes that an outside air temperature is higher than a freezing temperature of the washer solution.

An eighth disclosure further has the following features in any one of the fifth to seventh disclosures. The vehicle travel control device is configured to execute the washer operation without transmitting the approval request to the autonomous driving control device when the operation request condition is satisfied and the vehicle is stopped.

According to the first or fifth disclosure, the washer operation is executed when approval from the autonomous driving control device is received. As a result, it is possible to avoid execution of the washer operation at an inappropriate timing for the autonomous driving control device.

According to the second or sixth disclosure, when recognition failure of the surrounding situation sensor is caused by dirt on the windshield, the operation request for executing the washer operation can be transmitted to the autonomous driving control device.

According to the third or seventh disclosure, the operation request condition for executing the washer operation includes that an outside air temperature is higher than a freezing temperature of the washer solution. As a result, it is possible to suppress a situation in which the operation of the autonomous driving control device is affected by execution of the washer operation in a situation in which the water solution freezes.

According to the fourth or eighth disclosure, when the vehicle is stopped, which does not affect the operation of the autonomous driving control device, the washer operation can be executed without transmitting the approval request to the autonomous driving control device and receiving approval for the approval request from the autonomous driving control device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart showing a control routine of washer control executed by a second control device.

DETAILED DESCRIPTION OF EMBODIMENTS

Hereinafter, an embodiment of the disclosure will be described with reference to the drawings. However, in the following embodiment, when numbers of each element, such as the number, the quantity, the amount, the range, etc. thereof, are mentioned, the disclosure is not limited by the numbers mentioned unless explicitly stated or clearly specified in theory.

Embodiment

1. Overall Configuration of Vehicle Control System according to Embodiment

Figure 1:
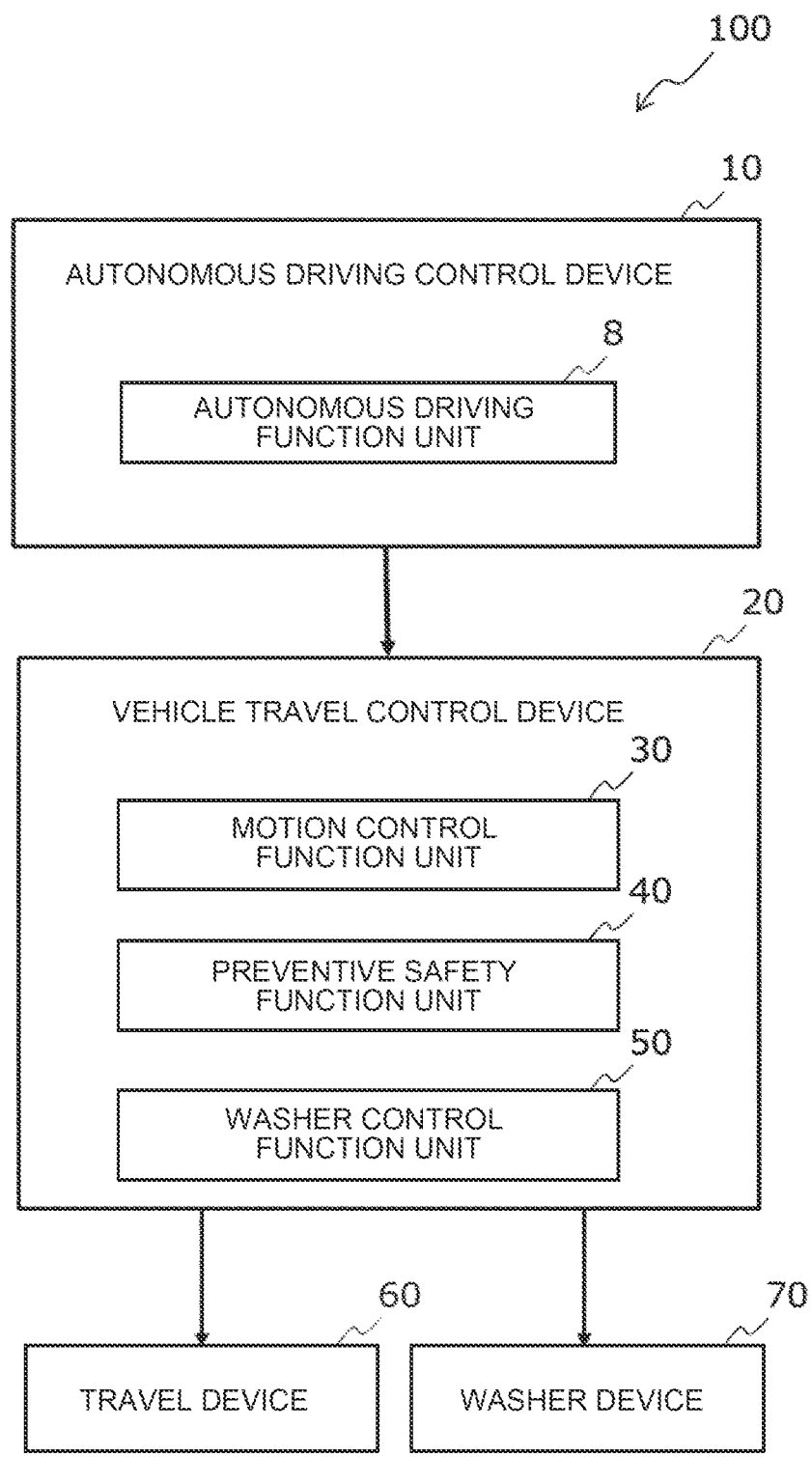
FIG. 1 is a block diagram showing a configuration example for illustrating an overview of a vehicle control system according to an embodiment.

First, a schematic configuration of a vehicle control system according to an embodiment will be described. FIG. 1 is a block diagram showing a configuration example for illustrating an overview of the vehicle control system according to the embodiment. The vehicle control system 100 shown in FIG. 1 is mounted on a vehicle. Hereinafter, the vehicle on which the vehicle control system 100 is mounted is also referred to as a "vehicle V1". The vehicle V1 is an autonomous driving vehicle capable of autonomous driving. As the autonomous driving described here, autonomous driving of level 3 or higher in the level definition set by Society of Automotive Engineers (SAE International) is assumed. The power source of the vehicle V1 is not limited.

The vehicle control system 100 controls the vehicle V1. Alternatively, at least a part of the vehicle control system 100 may be disposed on an external device outside of the vehicle V1 to remotely control the vehicle V1. That is, the vehicle control system 100 may be disposed so as to be divided on both the vehicle V1 and the external device.

As shown in FIG. 1, the vehicle control system 100 is configured to include an autonomous driving control device 10, a vehicle travel control device 20, a travel device 60, and a washer device 70. The autonomous driving control device 10 is a system for managing autonomous driving of the vehicle V1. The vehicle travel control device 20 is a system for performing vehicle travel control of the vehicle V1. The autonomous driving control device 10 and the vehicle travel control device 20 may be physically separate devices or may be the same device. When the autonomous driving control device 10 and the vehicle travel control device 20 are physically separate devices, these devices exchange necessary information via communication.

The travel device 60 includes a steering device, a driving device, and a braking device. The steering device steers wheels of the vehicle V1. The driving device is a drive source that generates a driving force for the vehicle V1. Examples of the driving device include an engine and an electric motor. The braking device generates a braking force for the vehicle V1. The travel device 60 controls traveling of the vehicle V1 based on the traveling control amount related to the steering, acceleration, and deceleration of the vehicle V1.

The washer device 70 is a device that executes washer operation for ejecting washer solution toward a windshield of the vehicle V1. The structure of the washer device 70 is not limited. The washer device 70 executes the washer operation in response to an operation request from a driver or the vehicle travel control device 20.

The autonomous driving control device 10 includes an autonomous driving function unit 8 as a function for autonomously driving the vehicle V1. Further, the vehicle travel control device 20 includes a motion control function unit 30, a preventive safety function unit 40, and a washer control function unit 50 as functions for performing vehicle travel control, preventive safety control, and washer control, respectively. Hereinafter, the configurations and functions of the autonomous driving control device 10 and the vehicle travel control device 20 will be described with reference to FIGS. 2 and 3.

2. Configuration and Function of Autonomous Driving Control Device

Figure 2:
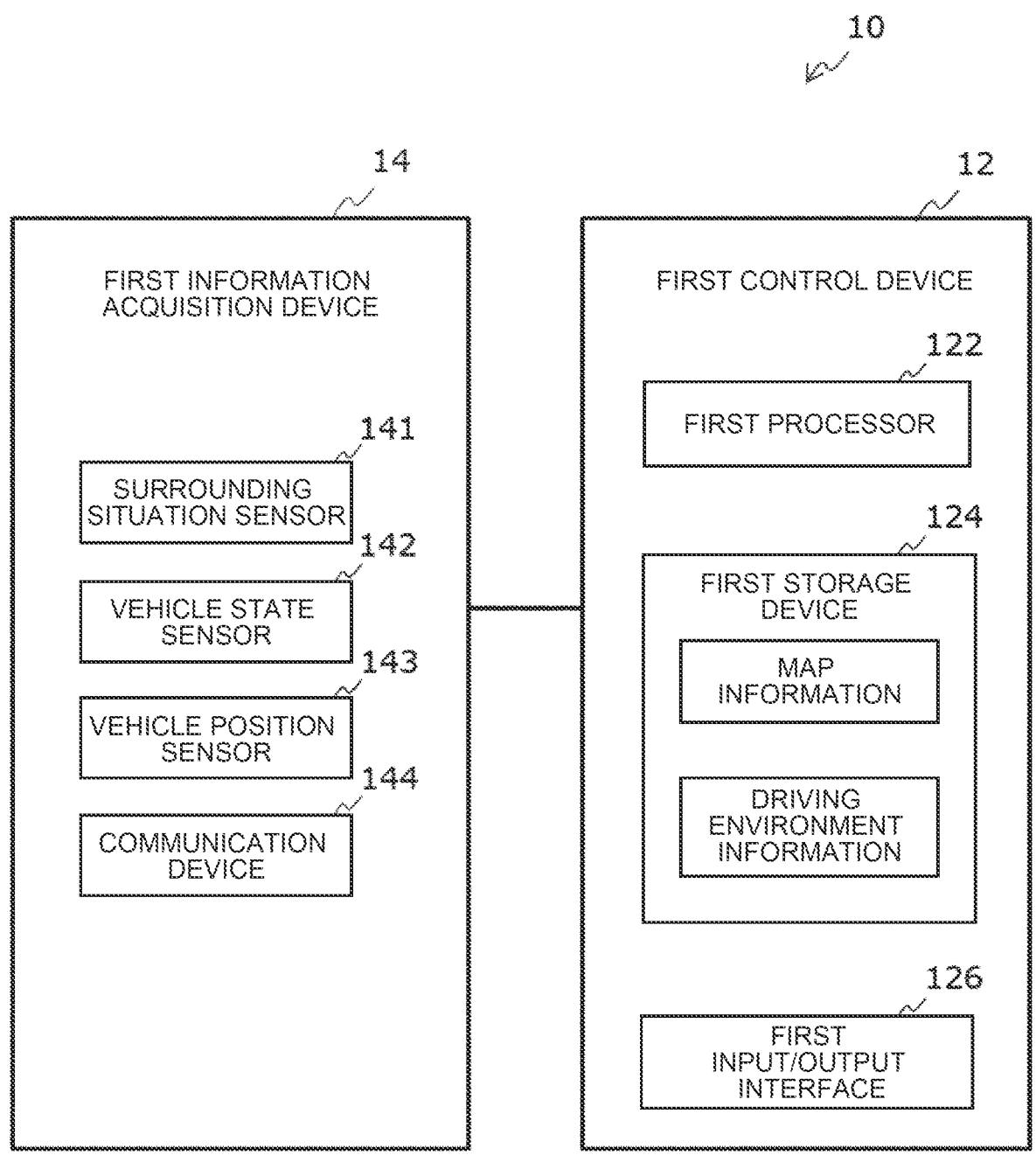
FIG. 2 is a block diagram showing a configuration example of an autonomous driving control device according to the embodiment.

FIG. 2 is a block diagram showing a configuration example of the autonomous driving control device according to the embodiment. As shown in FIG. 2, the autonomous driving control device 10 includes a first control device 12 for managing autonomous driving of the vehicle V1. Further, the autonomous driving control device 10 includes a first information acquisition device 14 connected to an input side of the first control device 12.

The first information acquisition device 14 is configured to include a surrounding situation sensor 141, a vehicle state sensor 142, a vehicle position sensor 143, and a communication device 144.

The surrounding situation sensor 141 recognizes surrounding information of the vehicle V1. Examples of the surrounding situation sensor 141 include a camera (imaging device), a laser imaging detection and ranging (LIDAR), a radar, and the like. The surrounding information includes object information recognized by the surrounding situation sensor 141. Examples of the object include surrounding vehicles, pedestrians, roadside objects, obstacles, white lines, traffic lights, and the like. The object information includes the relative position and the relative speed of the object with respect to the vehicle V1. The surrounding information recognized by the surrounding situation sensor 141 is transmitted to the first control device 12 as necessary.

The vehicle state sensor 142 detects vehicle information indicating a state of the vehicle V1. Examples of the vehicle state sensor 142 include a vehicle speed sensor, a lateral acceleration sensor, a yaw rate sensor, and the like. The vehicle information detected by the vehicle state sensor 142 is transmitted to the first control device 12 as necessary.

The vehicle position sensor 143 detects the position and the orientation of the vehicle V1. Examples of the vehicle position sensor 143 include a Global Positioning System (GPS) sensor. The GPS sensor receives a signal transmitted from a plurality of GPS satellites and calculates the position and the orientation of the vehicle V1 based on the received signal. The vehicle position sensor 143 may perform a well-known self-position estimation process (localization) to enhance the accuracy of the current position of the vehicle V1. The vehicle information detected by the vehicle position sensor 143 is transmitted to the first control device 12 as necessary.

The communication device 144 communicates with the external device of the vehicle. For example, the communication device 144 communicates with the external device of the vehicle V1 via the communication network. Examples of the external device include a roadside unit, a surrounding vehicle, surrounding infrastructure, and the like. The roadside unit is a beacon device that transmits, for example, traffic congestion information, traffic information for each lane, regulation information such as a stop, and traffic situation information at a blind spot. When the external device is a surrounding vehicle, the communication device 144 performs inter-vehicle communications (V2V communication) with the surrounding vehicle. Further, when the external device is surrounding infrastructure, the communication device 144 performs vehicle-roadside communication (V2I communication) with the surrounding infrastructure.

The first control device 12 is an information processing device that performs various types of processing in the vehicle control system 100. Typically, the first control device 12 is a microcomputer including a first processor 122, a first storage device 124, and a first input/output interface 126. The first control device 12 is also referred to as an electronic control unit (ECU).

Various types of information are stored in the first storage device 124. For example, the first storage device 124 stores driving environment information acquired by the first information acquisition device 14. The driving environment information is information indicating the driving environment of the vehicle V1, and includes the vehicle position information indicating the position of the vehicle V1, the vehicle state information indicating the state of the vehicle V1, surrounding situation information indicating the situation around the vehicle V1, and the like. Examples of the first storage device 124 include a volatile memory, a non-volatile memory, a hard disk drive (HDD), and the like.

The first storage device 124 stores map information including detailed road information. This map information includes, for example, a road shape, the number of lanes, information on a lane width, and the like. Alternatively, the map information may be stored in an external management server. In this case, the first control device 12 communicates with the management server to acquire the necessary map information. The acquired map information is recorded in the first storage device 124.

The first processor 122 executes autonomous driving software that is a computer program. The autonomous driving software is stored in the first storage device 124. Alternatively, the autonomous driving software is recorded in a computer-readable recording medium. The function of the first control device 12 is realized by the first processor 122 executing the autonomous driving software.

Specifically, the function of the autonomous driving function unit 8 is realized by the first processor 122 executing the autonomous driving software related to the autonomous driving of the vehicle V1. That is, the autonomous driving function unit 8 is incorporated in the first control device 12 as a function of autonomously driving the vehicle V1. Typically, the first control device 12 performs a target trajectory generation process for generating a target trajectory for autonomous driving of the vehicle V1.

Here, the target trajectory includes at least a collection of a target position [Xi, Yi] of the vehicle V1 in a road on which the vehicle V1 travels. The X direction here is a front direction of the vehicle V1, and the Y direction is a plane direction orthogonal to the X direction. The target trajectory may further include a target speed [VXi, VYi] for each target position [Xi, Yi].

In the target trajectory generation process, first, the first control device 12 acquires the driving environment information from the first information acquisition device 14. The driving environment information is stored in the first storage device 124. Next, the first control device 12 generates a target trajectory for autonomous driving of the vehicle V1 based on the map information and the driving environment information. More specifically, the first control device 12 generates a travel plan of the vehicle V1 during autonomous driving based on the map information and the driving environment information. The first control device 12 generates the target trajectory necessary for the vehicle V1 to travel according to the generated travel plan based on the driving environment information.

A known technique is applied to the target trajectory generation process performed by the autonomous driving control device 10. Therefore, a description of the function of the autonomous driving control device 10 related to the target trajectory generation process is limited to the above description. Details of the function of the autonomous driving control device 10 related to the features according to the embodiment will be described later.

The first input/output interface 126 is an interface for exchanging information with the vehicle travel control device 20. The target trajectory generated in the first control device 12 is output to the vehicle travel control device 20 via the first input/output interface 126.

3. Configuration and Function of Vehicle Travel Control Device

Figure 3:
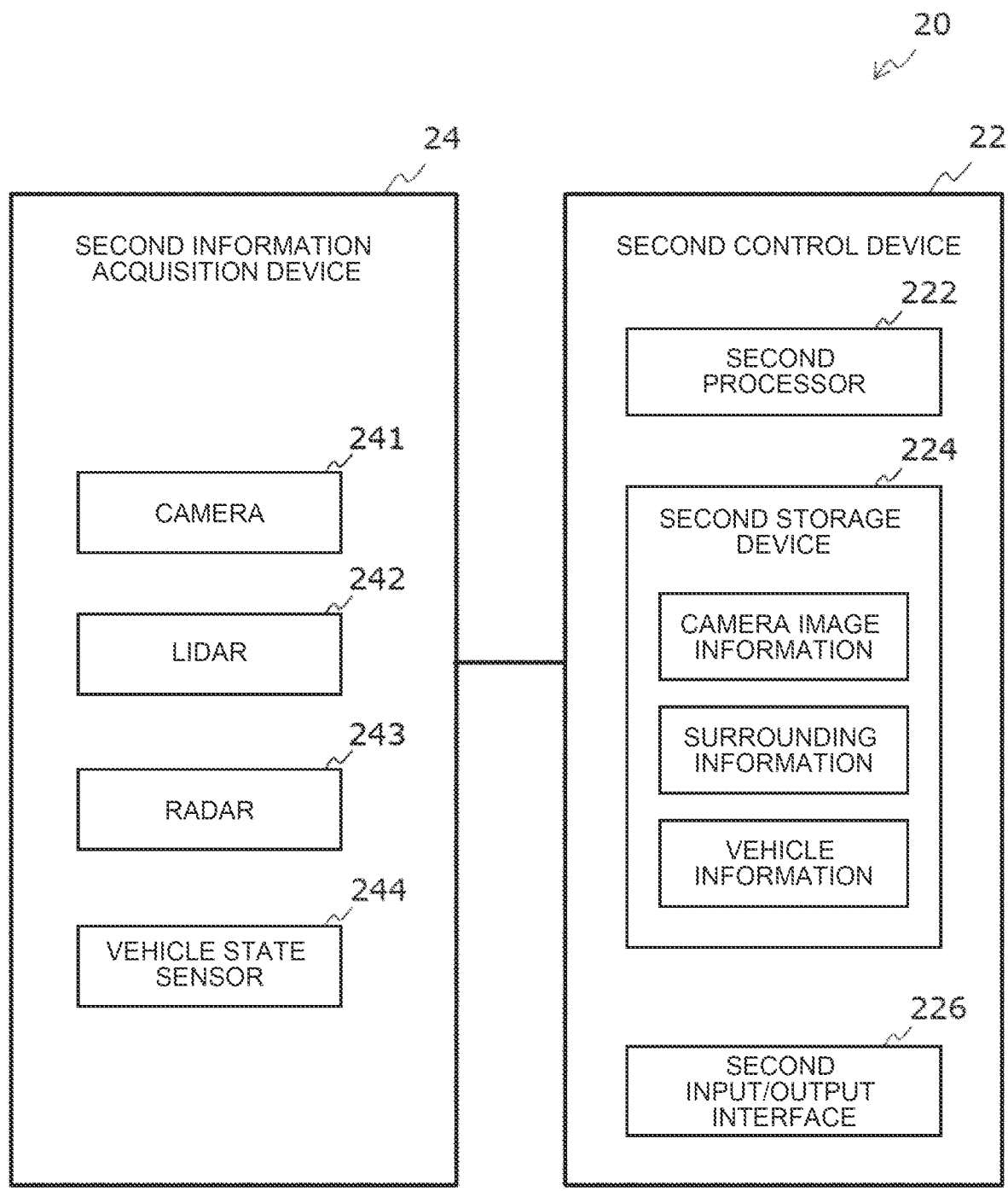
FIG. 3 is a block diagram showing a configuration example of a vehicle travel control device according to the embodiment.

FIG. 3 is a block diagram showing a configuration example of the vehicle travel control device according to the embodiment. As shown in FIG. 3, the vehicle travel control device 20 includes a second control device 22, a second information acquisition device 24, and a second input/output interface 226.

The second information acquisition device 24 includes a camera 241, a LIDAR 242, and a radar 243 as surrounding situation sensors for recognizing the surrounding information of the vehicle V1. Of these surrounding situation sensors, the camera 241 is mounted in the vehicle cabin of the vehicle V1, and the LIDAR 242 and the radar 243 are mounted outside of the vehicle cabin. The camera 241 captures images of an area in front of the vehicle V1 from the vehicle cabin via the windshield of the vehicle V1. In the following description, image information captured by the camera 241 via the windshield of the vehicle V1 is referred to as "camera image information". The camera image information captured by the camera 241 is transmitted to the second control device 22 as necessary.

The surrounding information recognized by the surrounding situation sensor includes the object information. Examples of the object include surrounding vehicles, pedestrians, roadside objects, obstacles, white lines, traffic lights, and the like. The object information includes the relative position and the relative speed of the object with respect to the vehicle V1. The surrounding information recognized by the surrounding situation sensor is transmitted to the second control device 22 as necessary.

The second information acquisition device 24 further includes the vehicle state sensor 244. The vehicle state sensor 244 detects vehicle information indicating the state of the vehicle V1. Examples of the vehicle state sensor 244 include a vehicle speed sensor, a lateral acceleration sensor, a yaw rate sensor, and the like. The vehicle information detected by the vehicle state sensor 244 is transmitted to the second control device 22 as necessary.

The first information acquisition device 14 and the second information acquisition device 24 may be partially commonized. That is, the autonomous driving control device 10 and the vehicle travel control device 20 may share a part of the first information acquisition device 14 or a part of the second information acquisition device 24. In this case, the autonomous driving control device 10 and the vehicle travel control device 20 exchange necessary information with each other.

Further, the second information acquisition device 24 may further include the same device as the vehicle position sensor 143 and the communication device 144 in addition to the sensors described above.

The second control device 22 is an information processing device that performs various types of processing in the vehicle control system 100. Typically, the second control device 22 is a microcomputer including a second processor 222, a second storage device 224, and a second input/output interface 226. The second control device 22 is also referred to as an electronic control unit (ECU).

Various types of information are stored in the second storage device 224. For example, the second storage device 224 stores the camera image information, the surrounding information, and the vehicle information acquired by the second information acquisition device 24. Examples of the second storage device 224 include a volatile memory, a non-volatile memory, a hard disk drive (HDD), and the like.

The second processor 222 executes vehicle travel control software that is a computer program. The vehicle travel control software is stored in the second storage device 224. Alternatively, the vehicle travel control software is recorded in a computer-readable recording medium. The function of the second control device 22 is realized by the second processor 222 executing the vehicle travel control software.

Specifically, each function of the motion control function unit 30, the preventive safety function unit 40, and the washer control function unit 50 is realized by the second processor 222 executing the vehicle travel control software related to the vehicle travel control. That is, the motion control function unit 30, the preventive safety function unit 40, and the washer control function unit 50 are incorporated in the second control device 22 as functions for performing vehicle travel control, preventive safety control, and washer control, respectively.

The motion control function unit 30, the preventive safety function unit 40, and the washer control function unit 50 may be incorporated in physically different control devices. In this case, the vehicle travel control device 20 may include each of a control device for the motion control function unit 30 that performs vehicle travel control, a control device for the preventive safety function unit 40 that performs preventive safety control, and a control device for the washer control function unit 50 that performs washer control.

The second input/output interface 226 is an interface for exchanging information with the autonomous driving control device 10. Approval for the target trajectory output from the first control device 12 and an approval request described later is input to the vehicle travel control device 20 via the second input/output interface 226.

4. Control Executed by Vehicle Travel Control Device

Next, vehicle travel control, preventive safety control, and washer control executed by the second control device 22 of the vehicle travel control device 20 will be described in more detail.

4-1. Vehicle Travel Control

The second control device 22 executes vehicle travel control that controls steering, acceleration, and deceleration of the vehicle V1. Typically, the second control device 22 executes the vehicle travel control by controlling the operation of the travel device 60. Specifically, the second control device 22 controls the steering of the vehicle V1 by controlling the steering device. The second control device 22 controls the acceleration of the vehicle V1 by controlling the driving device. The second control device 22 controls the deceleration of the vehicle V1 by controlling the braking device.

In the vehicle travel control, the second control device 22 receives the target trajectory from the autonomous driving control device 10 during the autonomous driving of the vehicle V1. Basically, the second control device 22 controls the traveling control amount related to the steering, acceleration, and deceleration of the vehicle V1 such that the vehicle V1 follows the target trajectory. Typically, the motion control function unit 30 calculates a deviation (for example, lateral deviation, yaw angle deviation, speed deviation, etc.) between various state quantities of the vehicle V1 and the target trajectory and executes the vehicle travel control such that the deviation is reduced.

4-2. Preventive Safety Control

The second control device 22 performs preventive safety control that intervenes in the traveling control amount of the vehicle travel control for the purpose of improving safety of the vehicle V1. Typically, the second control device 22 performs collision avoidance control for avoiding a collision between the vehicle V1 and a collision target during the autonomous driving of the vehicle V1. In the collision avoidance control, the second control device 22 acquires the surrounding information and the vehicle information from the second information acquisition device 24. The acquired information is stored in the second storage device 224. Next, the second control device 22 detects a target to be avoided based on the surrounding information and the vehicle information. Next, the second control device 22 determines whether the operating condition for the preventive safety control for the target to be avoided is satisfied. The operating condition is, for example, set as "the collision margin time (Time to Collision (TTC)) from the vehicle V1 to the target to be avoided is smaller than a predetermined threshold value". As a result, when the operating condition is satisfied, the second control device 22 calculates the intervened traveling control amount for avoiding the collision with the target to be avoided. The intervened traveling control amount thus calculated is output to the motion control function unit 30.

Basically, the motion control function unit 30 calculates the traveling control amount of the vehicle V1 such that the vehicle V1 follows the target trajectory. However, when the intervened traveling control amount is input from the preventive safety function unit 40, the motion control function unit 30 corrects the traveling control amount based on the intervened traveling control amount input from the preventive safety function unit 40. Typically, the motion control function unit 30 outputs the intervened traveling control amount as a final traveling control amount when the intervened traveling control amount is input from the preventive safety function unit 40.

4-3. Washer Control

When the visibility of the windshield of the vehicle V1 deteriorates due to dirt or the like, the recognition level of the surrounding situation by the camera 241 may also deteriorate. In this case, it is assumed that the preventive safety control function cannot be fully utilized.

Therefore, in the washer control, the second control device 22 executes washer operation for ejecting the washer solution from the washer device 70 toward the windshield when a condition that the recognition level of the surrounding situation by the camera 241 deteriorates due to the dirt on the windshield is satisfied. This condition is hereinafter referred to as an "operation request condition". The second control device 22 determines whether the operation request condition is satisfied based on the camera image information of the camera 241. For example, when the reliability (certainty) of object recognition based on the camera image information is lower than a predetermined threshold value and the dirt adheres to the windshield, the second control device 22 determines that the operation request condition is satisfied. Alternatively, when it is determined that a normal image area excluding an unchanged image area is smaller than a certain ratio in the camera image information during traveling of the vehicle V1, the second control device 22 determines that the operation request condition is satisfied as the dirt adheres to the windshield. Alternatively, when it is determined that a normal image area excluding a white image area or a black image area is smaller than a certain ratio in the camera image information, the second control device 22 determines that the operation request condition is satisfied as the dirt or snow adheres to the windshield.

However, when the driving environment information acquired by the first information acquisition device 14 includes the surrounding information acquired via the windshield, the washer operation may adversely affect the autonomous driving control executed by the first control device 12. Typically, when the washer solution is ejected toward the windshield of the vehicle V1 during the autonomous driving of the vehicle V1, the visibility of the imaging range captured by the surrounding situation sensor 141 may deteriorate. As described above, depending on the driving situation of the vehicle V1, there is a situation in which maintaining the function of the autonomous driving by the first control device 12 should be prioritized rather than recovery of the function of the preventive safety control by the second control device 22.

Therefore, with the vehicle control system according to the embodiment, when it is determined that the second control device 22 should execute the washer operation, the second control device 22 requests, to the first control device 12, approval for the washer operation. This request is hereinafter referred to as an "approval request". Upon receiving the approval request, the first control device 12 comprehensively determines the degree of influence on the autonomous driving for a case of executing the washer operation, and determines whether the approval request is approved.

The second control device 22 executes the washer operation when the first control device 12 approves the approval request. According to such control, the function of the preventive safety control of the vehicle travel control device 20 can be recovered without affecting the function of the autonomous driving by the autonomous driving control device 10.

When an outside air temperature is equal to or lower than a freezing temperature of the washer solution (for example, 0° C.), the washer solution ejected through the washer operation may adhere to the windshield and freeze, resulting in further deterioration of the visibility. Therefore, the second control device 22 may execute the washer control such that the washer operation is not executed when it is determined that the washer operation is necessary and the outside air temperature is equal to or lower than the predetermined freezing temperature.

Further, while the vehicle V1 is stopped, even when the washer operation is executed, the influence of execution of the washer operation on the control of the autonomous driving is small. Therefore, when it is determined that the washer operation is necessary and the vehicle V1 is not traveling, the second control device 22 may execute the washer control such that the washer operation is executed without transmitting the approval request to the autonomous driving control device 10.

As described above, with the vehicle control system 100 according to the embodiment, it is possible to avoid a situation in which the vehicle travel control device 20 executes the washer operation at an inappropriate timing for the autonomous driving control device 10.

5. Specific Processing of Washer Control Executed by Vehicle Control System

FIG. 4 is a flowchart showing a control routine of washer control executed by a second control device 22. The second control device 22 repeatedly executes the routine shown in FIG. 4 at a predetermined control cycle.

In step S100 of the routine shown in FIG. 4, the second control device 22 determines whether the operation request condition for the washer operation is satisfied. Here, the second control device 22 determines whether the recognition level of the camera 241 is lower than the predetermined threshold value. For example, the recognition level of the camera 241 can adopt, as an index, the reliability (certainty) of object recognition based on the camera image information, the ratio of the image area excluding the unchanged image area in the camera image, the ratio of the image area excluding the white image area or the black image area in the camera image, etc. When the determination is not established, it is determined that the washer operation is unnecessary, and the routine is terminated.

On the other hand, when the determination in step S100 is established, it is determined that the washer operation is necessary, and the routine proceeds to next step S102. In step S102, the second control device 22 determines whether the outside air temperature is equal to or lower than the specified value. As the specified value here, a preset value (for example, 0° C.) is read as a temperature at which the washer solution ejected toward the windshield freezes. When the determination is established, it is determined that the frozen washer solution affects the function of the autonomous driving by the autonomous driving control device 10, and the routine is terminated without executing the washer operation.

On the other hand, when the determination in step S102 is not established, the routine proceeds to next step S104. In step S104, the second control device 22 determines whether the vehicle V1 is traveling based on the vehicle information. When the vehicle V1 is stopped, it is determined that the washer operation does not affect the function of the autonomous driving by the autonomous driving control device 10, and the routine proceeds to the process of step S110. When the vehicle V1 is traveling, it is determined that the washer operation affects the function of the autonomous driving by the autonomous driving control device 10, and the routine proceeds to step S106.

In step S106, the second control device 22 transmits the approval request for the washer operation to the autonomous driving control device 10. The first control device 12 of the autonomous driving control device 10 comprehensively determines the degree of influence on the autonomous driving for a case of executing the washer operation, and determines whether the approval request is approved. Then, when the first control device 12 determines that the approval request is approved, the first control device 12 transmits the approval for the approval request to the vehicle travel control device 20.

When the processing in step S106 is performed, the routine proceeds to next step S108. In step S108, the second control device 22 determines whether the approval for the approval request has been received from the autonomous driving control device 10. When the second control device 22 does not receive the approval, it is determined that execution of the washer control affects the autonomous driving by the autonomous driving control device 10, and the second control device 22 waits until receiving the approval. On the other hand, when the second control device 22 receives the approval, it is determined that execution of the washer control does not affect the autonomous driving by the autonomous driving control device 10, and the routine proceeds to next step S110. In step S110, the second control device 22 executes the washer operation.

As described above, with the vehicle control system 100 according to the embodiment, it is possible to avoid execution of the washer operation at an inappropriate timing for the function of the autonomous driving by the autonomous driving control device 10.

5. Modification

The vehicle control system 100 according to the embodiment may employ the following modified modes.

In the control routine of the washer control shown in FIG. 4, the processing in step S102 and the processing in step S104 are not essential.

The operation request condition is not limited to a condition that the camera image information of the camera 241 is used as long as the operation request condition is a condition that the recognition level of the surrounding situation sensor is determined to deteriorate due to dirt on the windshield. That is, the operation request condition may be determined based on the surrounding information acquired by the LIDAR or the radar mounted on the vehicle cabin, for example, as long as the surrounding situation sensor that is affected by the dirt on the windshield is used.

The washer operation executed by the washer device 70 is not limited to operation in which the washer solution is ejected toward the windshield of the vehicle V1. That is, of the sensor devices included in the second information acquisition device 24, there may be sensor devices including the lens portion of the camera 241 or the radio wave transmitting portion of the LIDAR 242 and the radar 243 that is exposed to the outside of the vehicle V1. When the vehicle V1 is provided with such sensor devices, the washer operation executed by the washer device 70 may be considered as operation for ejecting the washer solution toward the lens portion or the radio wave transmitting portion of the sensor devices that is exposed to the outside of the vehicle V1. In this case, the operation request condition may be a condition indicating that the recognition level of the target sensor device has deteriorated.

The autonomous driving control device 10 and the vehicle travel control device 20 may be designed and developed separately. For example, the vehicle travel control device 20 that performs the vehicle travel control is designed and developed by a developer (typically a vehicle manufacturer) who is familiar with the mechanism and vehicle motion characteristics. In this case, the reliability of the vehicle travel control device 20 is extremely high. On the premise of using the preventive safety function unit 40 with high reliability, an autonomous driving service provider can design and develop software for the autonomous driving control device 10. In that sense, the vehicle travel control device 20 can be said to be a platform for the autonomous driving services.

What is claimed is:

1. A vehicle control system that controls a vehicle that performs autonomous driving, the vehicle control system comprising:
an autonomous driving control device includes a first control device including a first processor, a first input/output interface, and a first storage device, and a first information acquisition device that is in communication with the first processor, the first information acquisition device including a first surrounding situation sensor, a first vehicle state sensor, and a first vehicle position sensor, the autonomous driving control device is configured to:
generate a target trajectory for the autonomous driving of the vehicle, determine a degree of influence on the autonomous driving of the vehicle for a case of executing a washer operation upon receiving an approval request for the washer operation, and determine whether the approval request is approved based upon the determined degree of influence; and a vehicle travel control device includes a second control device including a second processor, a second input/output interface, and a second storage device, and a second information acquisition device that is in communication with the second processor, the second information acquisition device including a camera, a LIDAR, a radar, and a second vehicle state sensor, the vehicle travel control unit is configured to:

execute vehicle travel control that controls steering, acceleration, and deceleration of the vehicle such that the vehicle follows the target trajectory;

determine whether an operation request condition for washer operation for ejecting washer solution toward a windshield or a sensor device of the vehicle is satisfied based on determining that an area excluding an unchanged image area is smaller than a predetermined ratio in camera image information during traveling of the vehicle;

transmit the approval request for the washer operation to the autonomous driving control device when the operation request condition is satisfied; and execute the washer operation when approval for the approval request is received from the autonomous driving control device, wherein:

the vehicle includes a second surrounding situation sensor that recognizes a situation around the vehicle from a vehicle cabin via the windshield;

the vehicle travel control device is configured to, based on surrounding information acquired by the second surrounding situation sensor, execute preventive safety control that intervenes in a control amount of the vehicle travel control such that a collision between the vehicle and an obstacle is prevented or avoided;

the operation request condition includes that a recognition level of the surrounding situation sensor is lower than a threshold value;

the vehicle travel control device is configured to determine an intervened travel control amount based on the operation request condition being set as a collision margin time including a time-to-collision, from the vehicle to the obstacle to be avoided, is smaller than a predetermined threshold value; and the vehicle travel control device is configured to correct the control amount of the vehicle travel control based on the intervened travel control amount.

2. The vehicle control system according to claim 1, wherein the operation request condition includes that an outside air temperature is higher than a freezing temperature of the washer solution.

3. The vehicle control system according to claim 1, wherein the vehicle travel control device is configured to execute the washer operation without transmitting the approval request to the autonomous driving control device when the operation request condition is satisfied and the vehicle is stopped.

4. The vehicle travel control device according to claim 1, wherein the autonomous driving control device is configured to not give approval upon a determination that an outside air temperature is equal to or lower than a predetermined freezing temperature.

5. The vehicle control system according to claim 1, wherein the camera image information is captured by the camera.

6. A vehicle travel control device that receives a target trajectory for autonomous driving of a vehicle, the target trajectory being generated by an autonomous driving control device that includes a first control device including a first processor, a first input/output interface, and a first storage device, and a first information acquisition device that is in communication with the first processor, the first information acquisition device including a first surrounding situation sensor, a first vehicle state sensor, and a first vehicle position sensor, and that executes vehicle travel control that controls steering, acceleration, and deceleration of the vehicle such that the vehicle follows the target trajectory, the autonomous driving control device is configured to:

determine a degree of influence on the autonomous driving of the vehicle for a case of executing a washer operation upon receiving an approval request for the washer operation, and determine whether the approval request is approved based upon the determined degree of influence; and the vehicle travel control device includes a second control device including a second processor, a second input/output interface, and a second storage device, and a second information acquisition device that is in communication with the second processor, the second information acquisition device including a camera, a LIDAR, a radar, and a second vehicle state sensor, the vehicle travel control device is configured to:

determine whether an operation request condition for washer operation for ejecting washer solution toward a windshield or a sensor device of the vehicle is satisfied based on determining that an area excluding an unchanged image area is smaller than a predetermined ratio in camera image information during traveling of the vehicle;

transmit the approval request for the washer operation to the autonomous driving control device when the operation request condition is satisfied; and execute the washer operation when approval for the approval request is received from the autonomous driving control device, wherein:

the vehicle includes a second surrounding situation sensor that recognizes a situation around the vehicle from a vehicle cabin via the windshield;

the vehicle travel control device is configured to, based on surrounding information acquired by the second surrounding situation sensor, execute preventive safety control that intervenes in a control amount of the vehicle travel control such that a collision between the vehicle and an obstacle is prevented or avoided;

the operation request condition includes that a recognition level of the surrounding situation sensor is lower than a threshold value;

the vehicle travel control device is configured to determine an intervened travel control amount based on the operation request condition being set as a collision margin time including a time-to-collision, from the vehicle to the obstacle to be avoided, is smaller than a predetermined threshold value; and the vehicle travel control device is configured to correct the control amount of the vehicle travel control based on the intervened travel control amount.

7. The vehicle travel control device according to claim 6, wherein the operation request condition includes that an outside air temperature is higher than a freezing temperature of the washer solution.

8. The vehicle travel control device according to claim 6, wherein the vehicle travel control device is configured to execute the washer operation without transmitting the approval request to the autonomous driving control device when the operation request condition is satisfied and the vehicle is stopped.

9. The vehicle travel control device according to claim 6, wherein the autonomous driving control device is configured to not give approval upon a determination that an outside air temperature is equal to or lower than a predetermined freezing temperature.

10. The vehicle travel control device according to claim 6, wherein the camera image information is captured by the camera.

\* \* \* \* \*